(12) United States Patent
Stuart

(10) Patent No.: US 7,012,523 B2
(45) Date of Patent: Mar. 14, 2006

(54) SYSTEM FOR SURVEILLANCE OF AND COMMUNICATION WITH RESIDENTIAL ENTRYWAY FROM REMOTE LOCATION USING EXISTING TELEPHONE LINES

(76) Inventor: John C. Stuart, 10459 E. Hillery Dr., Scottsdale, AZ (US) 85255

( * ) Notice: Subject to any disclaimer, the term of this patent is extended or adjusted under 35 U.S.C. 154(b) by 127 days.

(21) Appl. No.: 10/402,272

(22) Filed: Mar. 28, 2003

(65) Prior Publication Data

US 2004/0085450 A1 May 6, 2004

Related U.S. Application Data

(60) Provisional application No. 60/423,652, filed on Nov. 5, 2002.

(51) Int. Cl.
*G08B 21/00* (2006.01)

(52) U.S. Cl. ............... 340/540; 340/545.3; 340/545.7

(58) Field of Classification Search ................. 340/540, 340/541, 545.1, 545.2, 545.3, 545.6, 545.7, 340/555, 556, 557; 348/155, 156, 360
See application file for complete search history.

(56) References Cited

U.S. PATENT DOCUMENTS

| | | | | |
|---|---|---|---|---|
| 4,524,384 A | * | 6/1985 | Lefkowitz et al. | 348/156 |
| 4,843,461 A | * | 6/1989 | Tatsumi et al. | 348/156 |
| 5,428,388 A | * | 6/1995 | von Bauer et al. | 348/155 |
| 5,726,430 A | * | 3/1998 | Ruggirello | 235/379 |
| 6,411,694 B1 | * | 6/2002 | Steller | 379/167.13 |
| 6,429,893 B1 | * | 8/2002 | Xin | 348/155 |

* cited by examiner

*Primary Examiner*—Van T. Trieu
(74) *Attorney, Agent, or Firm*—Tod R. Nissle, P.C.

(57) ABSTRACT

A surveillance system for the entryway of a residence utilizes an existing peephole in a door to install a camera and utilizes the existing telephones in a residence to communicate from within the residence with an individual standing in the entryway.

2 Claims, 6 Drawing Sheets

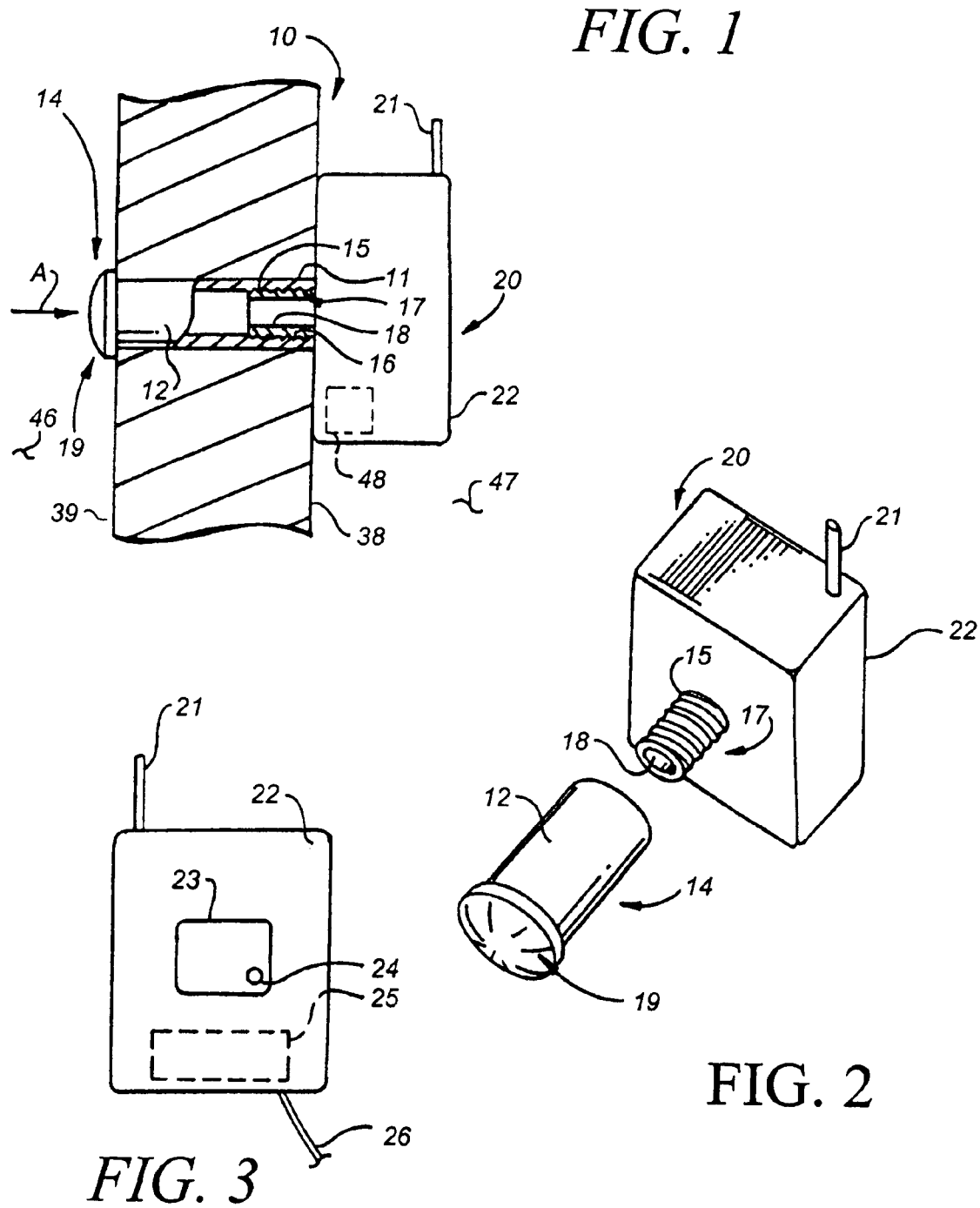

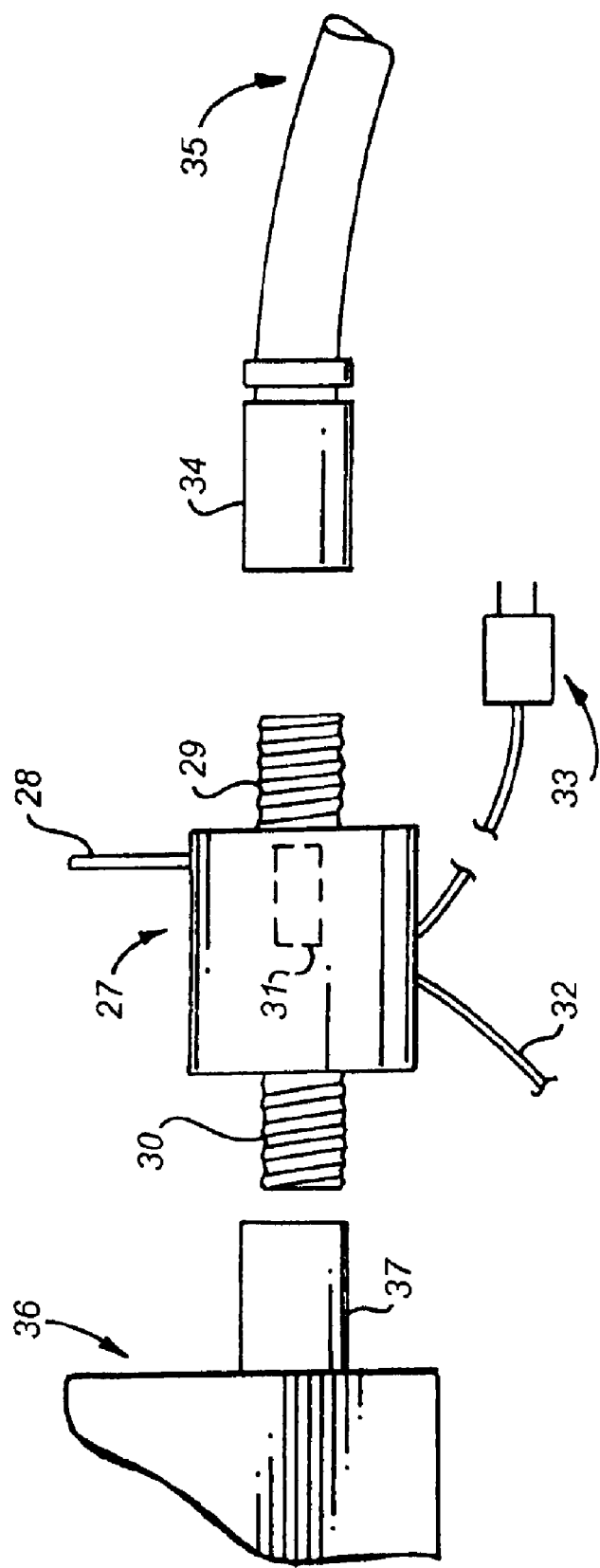

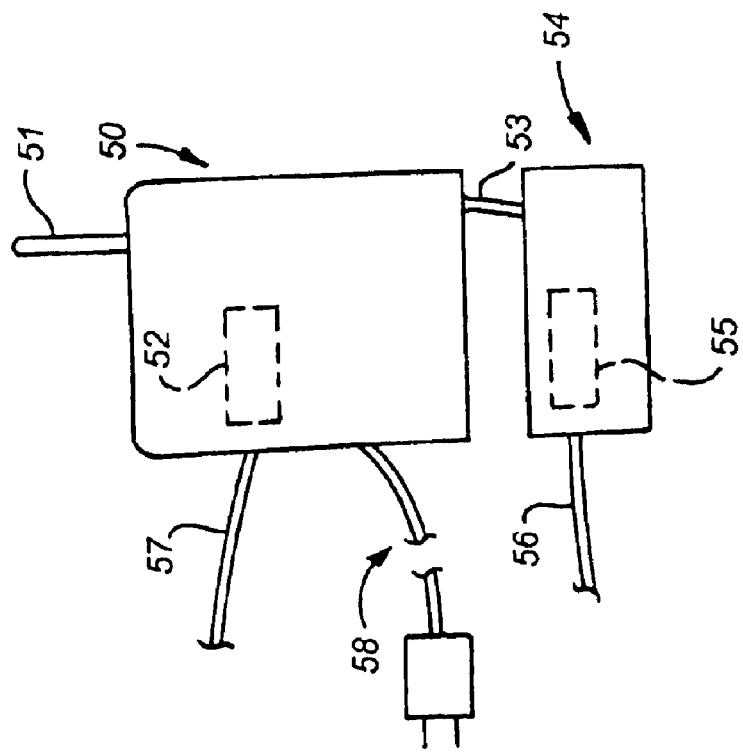
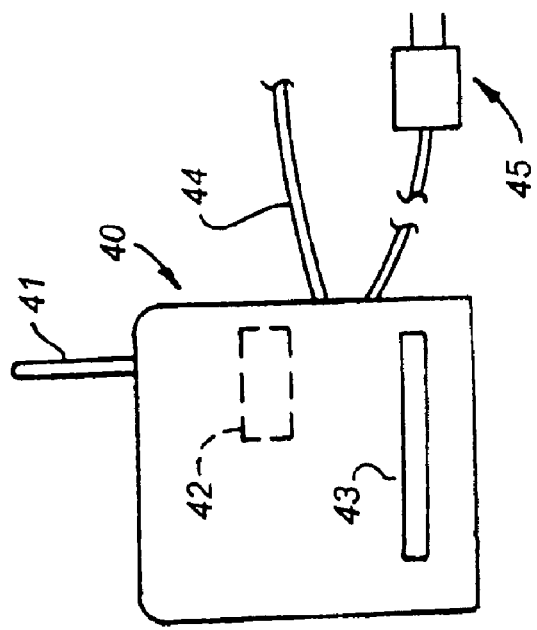
*FIG. 5*
*FIG. 6*

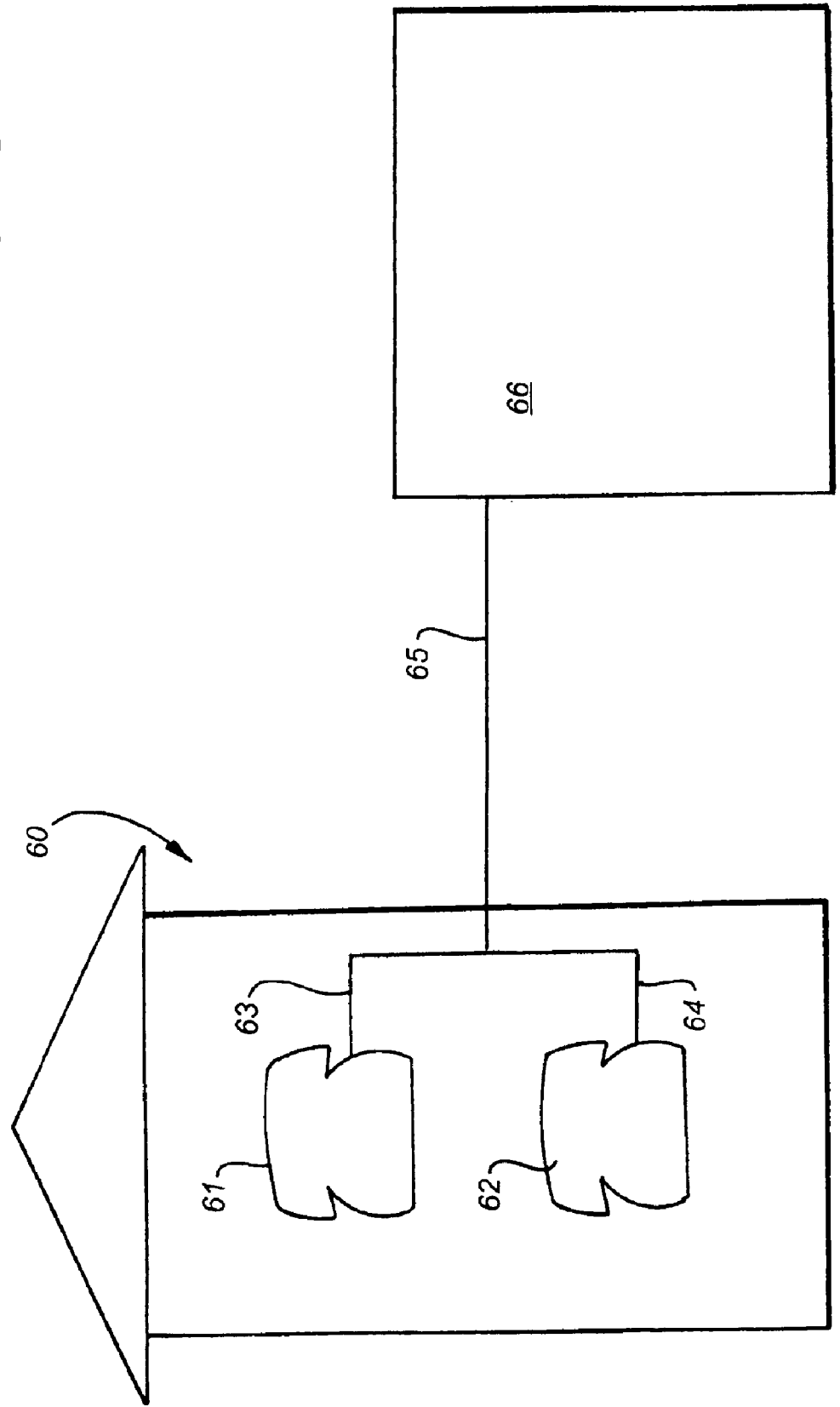

```
┌─────────────────────────────────────────────────────────────────┐
│ PROVIDE RESIDENCE WITH AT LEAST TWO TELEPHONES CONNECTED        │
│ TO REMOTE TELEPHONE COMPANY SWITCHING STATION, INCLUDING        │
│ TELEPHONE AT ENTRYWAY AND IN RESIDENCE              77          │
└─────────────────────────────────────────────────────────────────┘
                                  │
                                  ▼
┌─────────────────────────────────────────────────────────────────┐
│ PROVIDE DOOR MOUNTABLE DIGITAL CAMERA WITH TRANSMITTER AND      │
│ SENSOR, AND PROVIDE POWER SUPPLY FOR CAMERA.        78          │
└─────────────────────────────────────────────────────────────────┘
                                  │
                                  ▼
┌─────────────────────────────────────────────────────────────────┐
│ PROVIDE REMOTE RECEIVER WITH VISUAL DISPLAY, PROVIDE OTHER      │
│ UNITS ACTIVATED BY TRANSMITTER OR RECEIVER, AND PROVIDE         │
│ POWER SUPPLY FOR RECEIVER AND OTHER UNITS           79          │
└─────────────────────────────────────────────────────────────────┘
                                  │
                                  ▼
┌─────────────────────────────────────────────────────────────────┐
│ INSTALL DIAL TONE CONTROL SYSTEM IN REMOTE SWITCHING            │
│ STATION.                                            80          │
└─────────────────────────────────────────────────────────────────┘
                                  │
                                  ▼
┌─────────────────────────────────────────────────────────────────┐
│ INSTALL DIGITAL CAMERA WITH TRANSMITTER IN RESIDENCE            │
│ USING DOOR PEEP HOLE AT RESIDENCE ENTRYWAY.         81          │
└─────────────────────────────────────────────────────────────────┘
                                  │
                                  ▼
┌─────────────────────────────────────────────────────────────────┐
│ INSTALL REMOTE RECEIVER WITH VISUAL DISPLAY AND SENSOR IN       │
│ RESIDENCE.                                          82          │
└─────────────────────────────────────────────────────────────────┘
```

*FIG. 8*

```
┌─────────────────────────────────────────────────────────┐
│ AWAIT CHIME ACTIVATION OR ACTIVATION OF OTHER SIGNAL THAT│
│ INDIVIDUAL IS IN ENTRYWAY                            83 │
└─────────────────────────────────────────────────────────┘
                              │
                              ▼
┌─────────────────────────────────────────────────────────┐
│ VIEW INDIVIDUAL IN ENTRYWAY VIA VISUAL DISPLAY OR        │
│ THROUGH VIEWFINDER IN CAMERA                         84 │
└─────────────────────────────────────────────────────────┘
                              │
                              ▼
┌─────────────────────────────────────────────────────────┐
│ TAKE PHONE IN RESIDENCE OFF HOOK AND DIAL 22 TO CAUSE    │
│ DIAL TONE TO CEASE.                                  85 │
└─────────────────────────────────────────────────────────┘
                              │
                              ▼
┌─────────────────────────────────────────────────────────┐
│ ASK INDIVIDUAL IN ENTRYWAY TO TAKE ENTRYWAY PHONE        │
│ OFF HOOK.                                            86 │
└─────────────────────────────────────────────────────────┘
                              │
                              ▼
┌─────────────────────────────────────────────────────────┐
│ SPEAK TO INDIVIDUAL IN ENTRYWAY VIA TELEPHONE IN         │
│ RESIDENCE.                                           87 │
└─────────────────────────────────────────────────────────┘
```

*FIG. 9*

SYSTEM FOR SURVEILLANCE OF AND COMMUNICATION WITH RESIDENTIAL ENTRYWAY FROM REMOTE LOCATION USING EXISTING TELEPHONE LINES

CROSS REFERENCE TO RELATED APPLICATIONS

This application claims benefit of provisional application No. 60/423,652 filed Nov. 5, 2002.

STATEMENT REGARDING FEDERALLY SPONSORED RESEARCH OR DEVELOPMENT

N/A.

INCORPORATION-BY-REFERENCE OF MATERIAL SUBMITTED ON A COMPACT DISC (See 37 CFR 1.52(e)(5) and MPEP 608.05

N/A.

BACKGROUND OF THE INVENTION (1) Field of the Invention

This invention pertains to surveillance systems.

More particularly, this invention pertains to a surveillance system for the entryway to a residence.

In a further respect, the invention pertains to a surveillance system that facilitates monitoring a residence entryway and conversing with an individual standing in the entryway.

In another respect, the invention pertains to a surveillance system for a residence entryway that minimizes the cost of installing an intercom system so a person in the residence can verbally communicate with a person standing in the residence entryway.

(2) Description of Related Art Including Information Disclosed Under 37 CFR 1.97 and 1.98

The use of cameras to monitor the entryway to a building is well known. Such prior art cameras, while effective, have disadvantages. One typical disadvantage is that installation of the cameras requires the use of mounting hardware and tools. Another disadvantage is that prior art cameras often are exposed to out-of-doors weather elements. A further disadvantage is that prior art cameras typically only permit an individual inside a residence to view through a television monitor a person standing in a residence entryway. Still another disadvantage of prior art surveillance cameras is that they often are on continuously, shortening the life of the battery in the camera. Accordingly, it would be highly desirable to provide an improved surveillance camera and system for monitoring the entryway to a residence, which surveillance camera and system would simplify installation of the camera, would not expose a camera to ambient weather elements, would permit an individual inside a residence to view an individual standing in the entryway without using a television monitor, and would extend the life of the camera battery.

Therefore, it is a principal object of the instant invention to provide an improved surveillance system.

Another object of the invention is to provide an improved surveillance system that minimizes the cost of the components used in the system, simplifies installation of the components, and extends the life of system components.

A further object of the invention is to provide an improved surveillance system that can, without requiring the use of a television monitor, be utilized by a person in a residence to view an individual standing in the entryway of the residence.

Still another object of the invention is to provide an improved surveillance system that minimizes the power required to operate the system.

BRIEF DESCRIPTION OF THE SEVERAL VIEWS OF THE DRAWING(S)

These and other, further and more specific objects and advantages of the invention will be apparent from the following detailed description of the invention, taken in conjunction with the drawings, in which:

FIG. 1 is a partial side section view illustrating a camera unit mounted in an entryway door or wall in accordance with the principles of the invention;

FIG. 2 is an exploded assembly view of the camera unit of FIG. 1 illustrating further construction details thereof;

FIG. 3 is a rear view of the camera unit of FIG. 1 illustrating the viewfinder usable by an individual in a residence to view a person standing in the entryway outside the residence;

FIG. 4 is a side view illustrating a remote unit attachable to a television set to receive a signal from the camera unit of FIG. 1 and display the signal on the screen of the television set;

FIG. 5 is a front view illustrating a remote unit to receive a signal from the camera unit of FIG. 1 and store the signal on a CD or other media;

FIG. 6 is a front view illustrating a remote unit to receive a signal from the camera unit of FIG. 1 and to activate other related units in a residence;

FIG. 7 is a schematic view illustrating a dial tone control system utilized in the surveillance system of the invention;

FIG. 8 is block flow diagram illustrating installation of the surveillance system of the invention; and, FIG. 9 is a block flow diagram illustrating the mode of operation of the surveillance system of the invention.

BRIEF DESCRIPTION OF THE INVENTION

Briefly, in accordance with my invention, I provide an improved surveillance system for a residence including an inside area and an outer area. The outer area includes an entryway to access the inside area. The improved surveillance system includes a peephole opening at the entryway; a lens mounted in the peephole; and, a camera operatively associated with the lens and at least partially positioned in the inside area. The camera includes a viewfinder for an individual in the inside area to view at least a portion of the entryway, and a transmitter to transmit a signal including data defining the portion of the entryway viewed through the viewfinder. The surveillance system can include, if desired, a telephone, a battery to operate the camera, a remote unit to receive the transmitter signal and store data in the signal, or a remote unit to receive the signal and activate an electrically powered unit operatively associated with the surveillance system. The battery can be powered by electricity from a phone line, as can be the electrically powered units operatively associated with the surveillance system.

DETAILED DESCRIPTION OF THE INVENTION

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a door (or wall) 10 bounding an entryway in a residence. The door 10 includes outside surface 39 visible from the entryway area 46 of a residence and includes inside surface 38 visible from the inside area 47 of a residence. Cylindrical opening, or peephole, 11 is formed through door 10. Lens unit 14 includes lens 19 and includes hollow cylindrical body 12 shaped to be slidably inserted in opening 11. Lens 19 is attached to the proximate end of body 12. The inner surface of the distal end of body 12 is provided with threads 16.

As shown in FIG. 2, camera 20 includes hollow foot 17, antenna 21, and back surface 22. Foot 17 includes external threads 15 and cylindrical inner surface 18. Threads 15 turn into threads 16 in the manner illustrated in FIG. 1.

When the rear surface 22 of camera 20 is viewed by an individual standing in the inside area 47, the individual can look through view finder window 23 to see an image that is produced by lens 19. The image produced by lends 19 is of the portion of the entryway area 46 that falls within the field of vision of lens 19. The individual can also see a motion sensor 24 positioned in the lower right corner of window 23. The motion sensor 24 is mounted in lens 19. Sensor 24 detects an individual moving in entryway area 45 and generates a signal to microprocessor 48 that turns camera on from its normal "rest mode" to an active mode in which the microprocessor causes signals to be generated and transmitted via antenna 21, or, if desired, via a hard wire or any other desired transmission means. The signals comprise data defining the view of the entryway area 46 that is produced by light entering lens 19 in the direction generally indicated by arrow A. The signals can include other desired information. This view normally will include at least a portion of an individual standing in the entryway area 46 since it was the movement of the individual that was detected by sensor 24. As will be described below, the signals from transmitter antenna 21 can be received by any of a variety of receivers 28, 41, 51. Camera 20 is preferably, but not necessarily, a digital camera.

As can be seen in FIG. 1, camera 20 is in the inside area of a residence. Even if camera 20 is inset in a door (or wall) 10, the camera 20 is deemed to be in the inside area because the camera is not at least in part exposed to the out-of-doors weather elements.

Opening 11 can comprise an opening previously formed in a door or wall, or can comprise an opening newly formed to receive body 12.

While lens 19 is normally preferably positioned adjacent outer surface 39, lens 19 can, if desired, be inset in door 10, or even be mounted on foot 17. One or more auxiliary lens can, if desired, be mounted in lens unit 14 or camera 20 and used in conjunction with lens 19.

Transmitter antenna 21 can extend from the housing of camera 20 in the manner shown, or can be completely or partially integrated into the camera 20.

The signals from transmitter antenna 21 can include a signal from motion sensor 24 or from some other sensor that detects the presence of an individual in the entryway. Sensor 24 can be located remote from camera 20. The signals from transmitter antenna 21 can also include picture data defining a picture of the entryway. This picture normally would include at least a portion of an individual standing in the entryway in front of lens 19.

One remote receiver 27 than can receive signals from antenna 21 is the illustrated in FIG. 4. Receiver 27 includes externally threaded female connectors 29 and 30 that enable receiver 27 to be installed in line intermediate a co-axial cable 35 and television 36. Connector 30 is received by male connector 37. Connector 29 is received by male connector 34 at one end of co-axial cable 35. Cable 35 delivers video and audio signals to television 36. When antenna 28 of receiver 27 receives picture signals from antenna 21, these signals travel to television 36 and can be viewed on the screen of television 36. Receiver 27 can be powered by electricity provided when plug 33 is inserted in an electrical wall outlet, or, receiver 27 can be powdered by a battery 31. Battery 31 can, if desired, be rechargeable and be recharged with electricity received via line 32 from a telephone line or from another source.

Another remote receiver 40 that can receive signals from antenna 21 is illustrated in FIG. 5 and includes antenna 41, battery 42, and system 43 for storing data. System 43 can comprise a floppy disk, compact disk, magnetic tape, or any other means for storing data contained in a signal received by antenna 28 from antenna 21. Receiver 40 can be powered by electricity provided when plug 45 is inserted in an electrical wall outlet, or, receiver 40 can be powered by battery 42. Battery 42 can, if desired, be rechargeable and be recharged using electricity received via line 44 from a telephone line or from another source of electricity. When antenna 41 receives data in a signal transmitted by antenna 21, receiver 40 stores the data in system 43.

A further remote receiver 50 that can receive signals from antenna 21 is illustrated in FIG. 6 and includes antenna 51, battery 52, and a "hard" line 53 or other means for transmitting a signal to an auxiliary system or unit 54. Unit 54 includes a battery 55 and can, if desired, include an antenna or other means to receive wireless signals from unit 50. When antenna 51 receives data in a signal from antenna 21, receiver 50 functions to notify unit 54, to activate unit 54, or to transmit other data to unit 54. Receiver 50 can be powered by electricity provided when plug 58 is inserted in an electrical wall outlet or, receiver 50 can be powered by battery 52. Battery 52 can, if desired, be recharged using electricity received via line 44 from a telephone line or from another source of electricity. Similarly, unit 54 can be powered by electricity provided by a wall plug or can be powered by battery 55. Battery 55 can, if desired, be rechargeable and be recharged using electricity received via line 56 from a telephone line or from another source of electricity.

Unit 54 can, by way of example and not limitation, comprise a door bell, a light, an auto dialer, an intercom, a radio, a television, a door lock, a telephone, a stereo, a television, or any other electrically operated appliance or device in a residence. Each such device can be powered by electricity provided by a wall plug or can be powered by a battery. The battery can, if desired, be rechargeable and be recharged using electricity received via an electrical transmission line or connection from a telephone line or from another source of electricity. As used herein, a residence is a building structure in which at least one individual lives and/or works.

FIG. 7 illustrates a residence 60 including at least two telephones 61 and 62. Line 63 leads from telephone 61 to line 65. Line 64 leads from telephone 62 to line 65. Line 65 leads to a remote telephone company call processing/switching station or other operational station. For purposes of this discussion, it is assumed that telephone 62 is at the entryway of residence 60, although both telephones 61 and 62 can be positioned inside dwelling 60.

Call processing station 66 is program such that when phone 61 and/or 62 is lifted off hook and *22 (or some other number or sequence of symbols on a telephone keypad) is dialed (by pressing the "*" once and the "2" key twice), the station 66 recognizes *22 as an instruction to turn off dial tone until at least one phone 61 and 62 are hung up and placed back "on hook". And, consequently, station 66 turns off the dial tone. This permits an individual using phone 61 to speak to an individual using phone 62 which, in effect, permits the existing telephones 61 and 62 to be used as an intercom system.

Another method of using station 66 to eliminate dial tone is for a user to lift one of phones 61, 62 off hook, to dial *22, and to hang up and put the phone back on hook. Station 66 calls back the phone 61, 62 with a repeating ring pattern—for instance short-short-long—that indicates the phones 61 and 62 can be used as an intercom because station 66 has turned off dial tone. Individuals in residence 60 or standing at an entryway to residence 60 can pick up a phone 61 and 62 and use the phone as an intercom. Or, station 66 can continue the short-short-long ring pattern until one of phones 61 and 62 is taken off hook. Once the short-short-long ring pattern ceases, then a person standing near a telephone that is still on hook will know that someone in the residence 60 has taken a telephone 61, 62 off hook to use as an intercom.

FIG. 8 illustrates a process for equipping a residence with a surveillance system constructed in accordance with the invention. In step 77, a residence is provided with at least two telephones connected to a remote telephone company switching station. One of the telephones is at an entryway to the residence. The other phone is in the residence.

In step 78, a door mountable digital camera is provided. The camera includes a transmitter, a sensor, and a power supply. The camera ordinarily will also include a microprocessor for receiving a visual image, for producing digital data defining the visual image, and for transmitting the digital data as a signal via an antenna 21 or some other transmitting means including but not limited to microwave, fiber optic cable, electrical cable, and infrared.

In step 79, a remote receiver is provided. The receiver receives the signal transmitted by antenna 21 or by some other transmission means. The receiver includes a visual display. Other auxiliary units are provided that can be activated by a signal from the transmitter antenna 21 on the camera or that can be activated by the remote receiver. The other auxiliary units can include a doorbell, television, VCR, stereo, or other electrical appliances or units.

In step 80, the dial tone control system is installed in the remote telephone company switching station that is connected to the telephones in the residence. As described, the dial tone control system enables a resident to disable dial tone on the telephones in the residence and to use the telephones as an intercom system.

In step 81, the digital camera is installed, preferably on the inside of a door or wall bounding an entryway to the residence and preferably using a peep hole formed through the door or wall.

In step 82, the remote receiver with the visual display is installed in the residence. The other auxiliary units that are activated by the camera transmitter or by the receiver can also be installed. The other auxiliary units can be inside the residence (e.g., television, stereo, etc.) or can be outside the residence (e.g., flood lights mounted on the exterior of the residence, an alarm mounted on the exterior of the residence).

FIG. 9 illustrates one preferred mode of operation of the surveillance system of the invention. In step 83, an individual arrives at the entryway of a residence 60. Sensor 24 detects the presence of the individual and sends a signal to microprocessor 48. Microprocessor 48 activates camera 20 and generates a signal that is transmitted via antenna 21 to a receiver 27, 40, 50. The signal includes data defining a picture of the individual standing in the entryway and includes notification from sensor 24 that an individual is standing in the entryway. Antenna 51 of receiver 50 receives the signal from antenna 21 and transmits a signal via line 53 to an auxiliary unit 54 comprising a door bell. Unit 54 receives the signal and is activated. When unit 54 is activated it causes the doorbell speaker to produces chimes or other sounds indicating that an individual is standing at the door. Antenna 28 of receiver 27 receives the signal from antenna 21. Receiver 27 turns on television 36 and produces the picture of the individual on the television screen. Or, if the television is on, receiver 27 interrupts the program that is on and shows instead the picture of the individual on the television screen. Or, if the television is on, a notification (i.e., a word or words or symbol, etc.) appears in one corner of the screen and if the individual viewing the television so wishes, he or she turns to a designated channel that shows the picture of the individual standing at the entryway of the residence.

In step 84, the person inside the residence views on the screen of television 36 the individual standing in the entryway. The person in the residence then goes to the door and looks through viewfinder 23 to again view the individual standing in the entryway of the residence.

In step 85, the person inside the residence picks up phone 61, dials *22, and hangs up. Station 66 sends a continuously repeating ring pattern—short-short-long—and the person inside the residence takes phone 81 off hook, causing the ring pattern to cease. When the ring pattern ceases, the individual in the entryway of the residence knows that the person in the residence has picked up a phone 61 and know that he (the individual in the entryway) should pick up the phone 62 in the entryway.

In step 86 the individual in the entryway then takes the phone in the entryway off hook.

In step 87, the individual in the entryway speaks to the person in the residence.

One particular advantage of the surveillance system of the invention is that it is readily installed because it can utilize existing equipment. The camera is installed on an existing door or wall. The picture produced by the camera 20 can be shown on an existing television set in the residence. The existing telephone system in a residence 60 can be utilized as an intercom. Power from an existing telephone line can be used to provide electricity for batteries that are used to power camera 20, receivers 27 and 40 and 50, or auxiliary units 54. The camera 20 component, the receiver 27 and 40 and 50 component, the auxiliary unit 54 component, and the system for providing electricity to power batteries in the same, are described herein in a preferred embodiment of the invention as an integrated surveillance system. As would be appreciated by those of skill in the art, it may be desirable to use each of these components separately. For example, camera 20 can be utilized without remote receivers 27, 40, 50. If camera 20 is so used without receivers, the user can view through viewfinder 23 an individual standing in the residence entryway when the individual knocks on the door or uses an existing doorbell that is not operatively associated with camera 20. Or, the *22 dialing system can be used even if camera 20 and receivers 27, 50, 50 and auxiliary units 54 are not used. The *22 dialing system enables, as described above, telephones 61 and 62 to be utilized as an intercom system. Or, the system for supplying power with electricity from a telephone line or other source can be used to power batteries in any of various electrical appliances even if the camera 20, the receivers 27, 40, 50, and the *22 dialing system are not utilized.

Having described my invention in such terms as to enable those of skill in the art to make and practice it, and having described the presently preferred embodiments thereof, I claim:

1. A surveillance system for a residence including an inside area and an outer area, the outer area including an entryway to access the inside area, said system comprising
    (a) a peephole opening at said entryway;
    (b) a lens mounted in said peephole;
    (c) a camera operatively associated with said lens and at least partially positioned in the inside area, said camera including
        (i) a viewfinder for an individual in the inside area to view at least a portion of the entryway, and
        (ii) a transmitter to transmit a signal including data defining the portion of the entryway viewed through the viewfinder;
    (d) a rechargeable battery to operate said camera;
    (e) a telephone;
    (f) a telephone line operatively connected to said telephone to carry voice signals to and from said telephone and including electricity flowing through said phone line; and,
    (g) a system for providing electricity from said telephone line to trickle charge said battery.

2. A surveillance system for a residence including an inside area and an outer area, the outer area including an entryway to access the inside area, said system comprising
    (a) a peephole opening at said entryway;
    (b) a lens mounted in said peephole;
    (c) a camera operatively associated with said lens and at least partially positioned in the inside area, said camera including
        (i) a viewfinder for an individual in the inside area to view at least a portion of the entryway, and
        (ii) a transmitter to transmit a signal including data defining the portion of the entryway viewed through the viewfinder,
    d) a remote unit to receive said signal and activate an electrically powered unit operatively associated with said surveillance system; and,
    e) a telephone;
    f) a telephone line operatively connected to said telephone to carry voice signals to and from said telephone and including electricity flowing through said phone line; and,
    g) a system for providing electricity from said telephone line to trickle charge said electrically powered unit.

* * * * *